United States Patent [19]
Terashita

[11] Patent Number: 5,995,194
[45] Date of Patent: Nov. 30, 1999

[54] REPRODUCING MACHINE AND A METHOD OF DETERMINING REPRODUCING CONDITIONS

[75] Inventor: Takaaki Terashita, Kanagawa, Japan

[73] Assignee: Fuji Photo Film Co., Ltd., Kanagawa, Japan

[21] Appl. No.: 08/998,191

[22] Filed: Dec. 24, 1997

[30] Foreign Application Priority Data

Dec. 26, 1996 [JP] Japan .................................. 8-348605

[51] Int. Cl.$^6$ .......................... G03B 27/72; G03B 27/52
[52] U.S. Cl. .............................................. 355/35; 355/40
[58] Field of Search ................................... 396/310, 319; 355/27, 29, 40, 41, 77, 38, 35; 358/501, 530

[56] References Cited

U.S. PATENT DOCUMENTS

| | | | |
|---|---|---|---|
| 5,223,892 | 6/1993 | Ikenoue et al. | 355/77 |
| 5,337,130 | 8/1994 | Satoh | 355/77 |
| 5,353,095 | 10/1994 | Terashita | 355/38 |
| 5,729,284 | 3/1998 | Ishii et al. | 348/96 |
| 5,729,327 | 3/1998 | Narita | 355/27 |
| 5,729,329 | 3/1998 | Ajimu et al. | 355/40 |

FOREIGN PATENT DOCUMENTS

| | | |
|---|---|---|
| 52-23936 | 2/1977 | Japan . |
| 52-156624 | 12/1977 | Japan . |
| 52-156625 | 12/1977 | Japan . |
| 53-12330 | 2/1978 | Japan . |
| 53-145620 | 12/1978 | Japan . |
| 53-145621 | 12/1978 | Japan . |
| 53-145622 | 12/1978 | Japan . |
| 54-28131 | 3/1979 | Japan . |
| 4-319933 | 11/1992 | Japan . |
| 4-346333 | 12/1992 | Japan . |
| 4-352148 | 12/1992 | Japan . |
| 5-72647 | 3/1993 | Japan . |
| 5-72648 | 3/1993 | Japan . |
| 5-72649 | 3/1993 | Japan . |
| 5-127270 | 5/1993 | Japan . |
| 6-160996 | 6/1994 | Japan . |
| 6-167756 | 6/1994 | Japan . |
| 6-208178 | 7/1994 | Japan . |
| 8-122944 | 5/1996 | Japan . |
| 8-184925 | 7/1996 | Japan . |

*Primary Examiner*—Safet Metjahic
*Assistant Examiner*—Hung Henry Nguyen
*Attorney, Agent, or Firm*—Sughrue, Mion, Zinn, Macpeak & Seas, PLLC

[57] ABSTRACT

By the present invention, on the basis of information read from a magnetic recording section of a negative film (Step 200), when it is judged that there are a plurality of negative images to be exposed by the same exposure amount (the judgment in Step 212 is affirmative), a film type is identified to determine the film base density thereof, and a predetermined reference density value is added to the film base density so as to obtain a density control amount which controls the density of a print image (Steps 216 through 220). Thereafter, a color balance mean value of a large number of negative images of the same type is detected and a weighted mean value of a color balance mean value among a plurality of negative images to be exposed and the detected color balance value to obtain a color control amount (Step 222). Then, a common exposure amount is computed from the thus obtained density control amount and the color control amount (Step 224) for exposing the negative images to be exposed by the same exposure amount onto a printing paper by the common exposure amount (Step 278).

17 Claims, 9 Drawing Sheets

F I G. 4
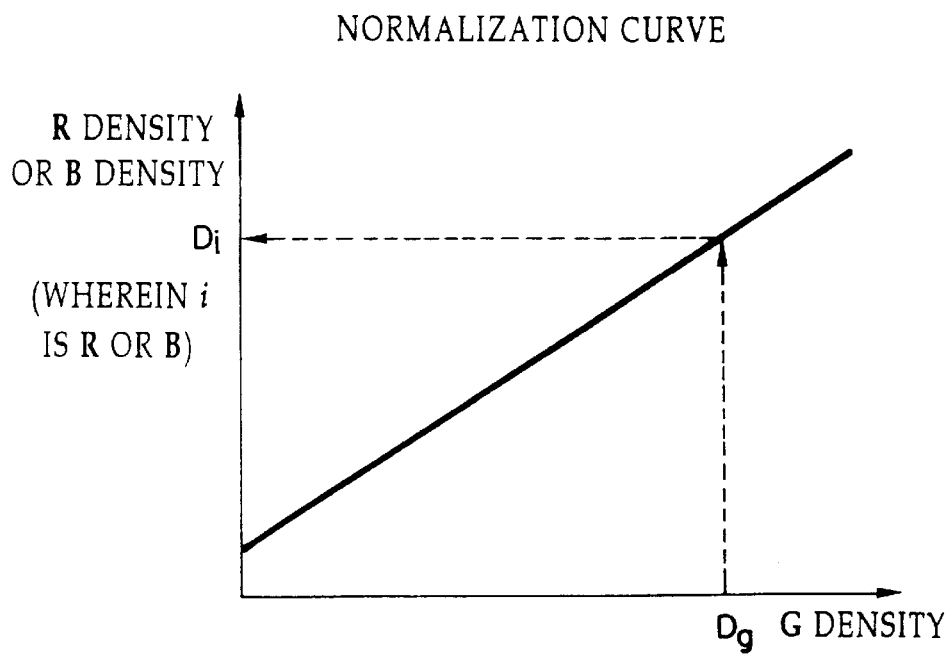

REPRODUCING MACHINE AND A METHOD OF DETERMINING REPRODUCING CONDITIONS

BACKGROUND OF THE INVENTION

1. Field of the Invention

The present invention relates to a reproducing machine and a method of determining reproducing conditions, and more particularly to a method of determining reproducing conditions which determine conditions for reproducing images which are recorded on a photographic film having an information recording section, and to a reproducing machine to which the method of determining reproducing conditions is applicable.

2. Description of the Related Art

In recent years, a photographic film (which is referred to as an APS film hereinafter) on which a magnetic recording layer is formed by a transparent magnetic material being coated thereon has been known. Because information or the like indicating photographic conditions such as an exposure and the like at the time of photographing are recorded on the magnetic recording layer of an APS film by a camera, negative images are printed at a photo-finishing laboratory (hereinafter referred to just as a laboratory) by determining an exposure amount with respect to a negative image on the basis of information or the like indicating photographic conditions which have been recorded on the magnetic recording layer of the APS film so that in accordance with photographic conditions or the like, images with high quality can be printed. Further, for example, various instructions provided for a laboratory including a print aspect ratio, the number of prints and the like can be recorded on the magnetic recording layer of the APS film and various instructions can be transmitted to the laboratory via the magnetic recording layer of the APS film.

An FTPM (Fixed Timer Printing Method) signal may be recorded on the magnetic recording layer of the APS film. The FTPM signal is a signal which instructs a laboratory to expose all of the images recorded on the APS film by the same exposure amount. The FTPM signal is recorded on the magnetic recording layer by a user via a camera or the like especially in a case in which all of the images which have been recorded on the APS film must have a fixed finish, as is the case of a portrait photo to be attached to an identification card, a product sample photo or the like, or in a case in which an exposure amount for each of negative images at the time of photographing is deliberately changed by the photographer (user)'s intention.

In a case in which the FTPM signal is recorded on the magnetic recording layer of the APS film, at a laboratory, all of the images recorded on the APS film are exposed to a reproducing material by the same exposure amount, and images are printed. However, in a case in which all of the images are instructed to be exposed onto the APS film by the same exposure amount in accordance with the FTPM signal, no concrete method for determining an exposure amount for all of the images in order to make prints each having a proper finish among all of the images has been made apparent.

What can be generally considered as a method for controlling exposure amount for each of images which are instructed to be exposed by the same exposure amount is a so-called 'timer exposure method' by which each image is exposed by a predetermined amount of exposure during a fixed period of time.

In accordance with the timer exposure, because each image is exposed by the same exposure amount regardless of the density or the like at the main or background portion of the image, the print finish does not vary due to a density or the like at a main or background portion of the image (a so-called object dependency does not exist). However, as compared to an ordinary exposure control method in which each image is metered and an exposure amount for the image is determined on the basis of a mean density of the image, in the timer exposure method, there is a drawback in that, because variation in the sensitivity of a photographic film or in a development process of the photographic film is not reflected in the exposure amount, and is not corrected therefore, the possibility for obtaining a print image having a proper finish is excessively low.

In view of the aforementioned, Japanese Patent Application Laid-Open (JP-A) No. 4-319933 discloses a photographic printing method in which, when the images, which are photographed and recorded on a photographic film by a camera provided with a function to meter the images by a plurality of metering elements and determine an exposure, are printed, a plurality of image frames are metered, a print exposure amount is determined on the basis of a mean value of the metered values of all of the image frames, and the plurality of image frames are printed in accordance with the thus determined print exposure amount. Further, Japanese Patent Application Laid-Open (JP-A) No. 6-160996 discloses a photographic printing method in which images recorded on a photographic film are sorted into groups in accordance with photographic conditions, and the images which have been sorted into the same group are printed by the same or similar exposure amount.

Moreover, Japanese Patent Application Laid-Open (JP-A) No. 4-352148 discloses a photographic printing method in which, when the images, which have been photographed and recorded on a photographic film by a camera provided with a function to meter the images by a plurality of metering elements and determine exposure at the time of focusing, are printed, the focused metering area is made to be an area in which a main object is disposed, the area is metered for each of a plurality of image frames, a print exposure amount is determined on the basis of a mean value of the metered values, and a plurality of image frames are printed on a printing paper on the basis of the thus determined print exposure amount.

In the art of any of the above-described applications, a print exposure amount is determined on the basis of a mean value of metered values of the images which have been photographed by a camera which can determine an exposure with a high degree of accuracy.

Further, Japanese Patent Application Laid-Open (JP-A) No. 5-72647, Japanese Patent Application Laid-Open (JP-A) No. 5-72648, Japanese Patent Application Laid-Open (JP-A) No. 5-72649, Japanese Patent Application Laid-Open (JP-A) No. 5-127270, and Japanese Patent Application Laid-Open (JP-A) No. 6-167756 disclose a method of determining a print exposure amount on the basis of a ratio of an image density value for each of image frames with respect to a mean value of metered values obtained by metering a plurality of image frames of a film, the film being photographed by a camera which can determine a proper exposure, or on the basis of an exposure correction amount which is determined by photographic conditions.

Further, Japanese Patent Application Laid-Open (JP-A) No. 6-208178 discloses a method of determining a print exposure amount on the basis of a print density control amount common to a plurality of image frames which have been photographed by a camera which can automatically determine an exposure amount, and a color balance control amount which is determined for each of the image frames in accordance with metered values of the image frames.

In this way, it has been conventionally proposed that, with respect to all of the images which are recorded on a photographic film, or all of the images which are selected by identifying exposure accuracy or metering accuracy of a camera, a common exposure amount is determined for each of the images on the basis of a mean value of metered values of respective images, or an exposure amount for each image is determined by further effecting various corrections on the common exposure amount.

However, as described above, assuming that a common exposure amount is determined on the basis of a mean value of metered values (a mean value of density values) and a plurality of images which are instructed by the FTPM signal to be exposed by the same exposure amount are exposed by the determined common exposure amount, even if the exposure which has been determined by a camera at the time of photographing is accurate, in a case in which all or a large number of images are those which are photographed in a relatively bright background, all of the photographic prints resulting from respective images are images having a high degree of density. Meanwhile, in a case in which all or a large number of images are those which are photographed in a relatively dark background (for example, images with a night view photographed or the like), all of the photographic prints obtained from respective images are images having a low degree of density. Accordingly, so-called density failure is caused. Or in a case in which a background against which images are photographed is restricted to a specified color, color failure is also caused.

Further, in a method of determining a common exposure amount on the basis of a mean value of metered values of respective images, even if a plurality of images which are instructed to be exposed by the same exposure amount are those which are photographed intentionally at underexposure by a photographer in order to reproduce a hi-light image portion, a problem arises in that since the common exposure amount is determined so as to maintain a mean density of the image of a photographic print substantially constant, a photographic print having a finish which meets the photographer's intention cannot be obtained. This is a problem that may be caused in a similar manner to the above-described problem when the photographer takes pictures at overexposure.

Moreover, a series scene signal may be recorded on the magnetic recording layer of an APS film. The series scene signal is a signal which instructs that a specified plurality of images among images which are recorded on the APS film are exposed by the same exposure amount. As described above, there is a problem that it can occur with a high possibility that a print image having a proper finish from each of the images which have been instructed by the FTPM signal to be exposed by the same exposure amount cannot be obtained. The problem may also cause to a specified plurality of images which are instructed by a series scene signal to be exposed by the same exposure amount.

SUMMARY OF THE INVENTION

In view of the aforementioned facts, it is an object of the present invention to provide a reproducing machine and a method of determining reproducing conditions in which reproduced images each having a proper finish can be obtained with a high degree of possibility from a plurality of images which have been instructed to be reproduced under the same reproducing conditions.

In order to attain the aforementioned object, in accordance with a first aspect of the present invention, there is provided a reproducing machine, comprising reading means for reading information recorded on a photographic film and an information recording section of the photographic film, selecting means for selecting negative images to be reproduced under the common reproducing conditions from a plurality of negative images recorded on the photographic film, on the basis of the information read by the reading means, density control amount determining means for determining a density control amount which controls density of negative images to be reproduced, on the basis of film base density and a reference density of a photographic film; color control amount determining means for determining a color control amount which controls colors of the negative image to be reproduced, on the basis of a color balance value which is determined from a large number of negative images; common reproducing conditions computing means for computing common reproducing conditions in accordance with the density control amount determined by the density control amount determining means and the color control amount which is determined by the color control amount determining means, and reproducing control means for reproducing each of a plurality of negative images which are selected by the selecting means under the common reproducing conditions computed by the common reproducing conditions computing means.

The reading means reads information recorded on the information recording section of the photographic film. On the basis of the read information, the selecting means selects negative images to be reproduced under the same reproducing conditions. It is to be noted that the information recording section may be provided at the photographic film itself. Or assuming that the information recording section logically corresponds to the film by 1 to 1, it may be provided independently of the photographic film (e.g., a memory card, a floppy disc, or the like). In this case, information may be recorded magnetically or optically. Moreover, information which is recorded on the information recording section may be an FTPM signal or a series scene signal, or may be photographic information about a magnitude, a subject brightness, or the like. The selecting means selects, as images to be reproduced under the same reproducing conditions, a plurality of negative images which are indicated by the FTPM signal or the series scene signal, or a plurality of negative images which can be judged to be similar to each other on the basis of photographic information or the like.

Further, the density control amount determining means determines a density control amount which controls the density of images to be reproduced on the basis of a film base density and a reference density of a photographic film. For example, a value which is determined by metering a photographic film having negative images to be reproduced, or a value which is determined by metering a plurality of photographic films of the same type as the photographic film can be used as a photographic film base density.

For example, in a case in which a value which is determined by metering a plurality of photographic films of the same type as the photographic film on which negative images are reproduced is used as a film base density, a control amount can be obtained as a density control amount. The density control amount can correct the variation of density of the images to be reproduced. The variation is caused by the film base density being different for each type of film.

Further, the film base density of the photographic film actually varies due to the development conditions at the time of developing the photographic film. However, as described above, in a case in which a value which is determined by metering the photographic film having negative images to be reproduced is used as a film base density, it is possible to obtain a control amount as a density control amount. The density control amount thus obtained can correct the variation of density of the images to be reproduced due to the variation of the film base density for each type of films as well as the variation of density of the images to be reproduced due to the variation of the film base density due to the variation of the development conditions when a photographic film has been developed.

Moreover, for example, a predetermined fixed value can be used as a reference density value. In a case in which a predetermined fixed value is used as the reference density value, a determination of a density control amount will be made independently of what kind of and/or how many images are included in a plurality of negative images to be reproduced under the same reproducing conditions. Accordingly, it is possible to obtain a control amount as a density control amount such that density failure can be prevented from being caused to an image to be reproduced, and the image to be reproduced can be adjusted to have a density which corresponds to the photographer's intention.

Further, a reference density value can be determined by negative images to be reproduced. In this case, it is preferable that the density control amount determining means further selects specified negative images corresponding to predetermined conditions among a plurality of negative images selected by the selecting means, and determines a reference density value from density values of the specified negative images, which are determined by metering the selected specified negative images. Conditions about whether the mean density of the image screen of a negative image is within a predetermined range or not, or whether the difference between densities of the main portion and the background portion in the negative image is within a predetermined range, or the like can be used as the predetermined conditions.

Therefore, all of images on a photographic film comprise images in each of which density is excessively high or low such that the mean density thereof is out of a predetermined range, images which may often cause density failure such that densities between the main portion and the background portion of each of the images are noticeably different, namely, images in which a density value which can control properly the density of images to be reproduced can be obtained with a low degree of possibility. The above-described images are removed from all of the images and the remaining images are referred to specified negative images. Since a reference density value can be determined by using merely the density value of the specified negative images (e.g., a mean density of all the images, a density at the main portion of a negative image, or the like), a control amount can be obtained as a density control amount which prevents density failure from being caused to the images to be reproduced and which can properly control the density of the images to be reproduced.

Moreover, during the manufacturing process or before the development process of a photographic film, a fixed pattern image is printed previously at a specified position, i.e., a head portion or an end portion of the photographic film, and the density obtained by metering the pattern image can be used as a reference density value at the time of determining reproducing conditions.

On the other hand, color control amount determining means determines a color control amount which controls colors of the images to be reproduced, on the basis of a color balance value which is determined by a plurality of negative images. For example, a color balance value, which is determined by metering a large number of negative images recorded on a plurality of photographic films of the same type as the photographic film having negative images to be reproduced, can be used. Accordingly, a control amount as a color control amount which corrects the color balance of each of the images to be reproduced in accordance with the color balance which is different for each of the types of film can be obtained. Further, even if the negative images to be reproduced are those which may often cause color failure, because the color control amount is not affected by this, color failure can be prevented from affecting the images to be reproduced, and the color of light source can be reproduced as it is.

The color balance value is not limited to the above description. For example, the mean value of the color balance value of a plurality of negative images can be determined and used by metering the plurality of negative images to be reproduced. Or the color balance value can be determined such that specified images corresponding to the predetermined conditions are further selected from the plurality of negative images, and the selected specified images are metered so that the color balance value of the specified negative images can be determined and used. However, as described above, especially in a case in which a color balance value is determined by the negative images to be reproduced, it is desirable that the color balance value is determined from the area from which a high chromatic area is removed in the negative image in order to prevent the color balance value from being affected by color failure.

Since the common reproducing conditions computing means computes the common reproducing conditions by using the density control amount and the color control amount which have been determined as described above, as the common reproducing conditions, reproducing conditions, which have been corrected in accordance with the film base density or the color balance which is different due to the film type or the like, can be provided. Further, the common reproducing conditions computing means can prevent common reproducing conditions from changing depending upon which type of contents the images do have or in what ratio the images are included in a plurality of images which are instructed to be reproduced under the same reproducing conditions. The reproducing control means reproduces each of a plurality of negative images which are selected by the selecting means under the common reproducing conditions which are computed by the common reproducing conditions computing means. Accordingly, density failure or color failure can be prevented from causing among a plurality of images which are instructed to be reproduced under the same reproducing conditions, and images to be reproduced with a proper finish which meets the photographer's intention can be obtained with a satisfied degree of possibility.

At this point, when images are photographed and recorded on a photographic film, a photographer may often correct the exposure of the images by himself or herself for the purpose of correcting the sensitivity of the photographic film or the like. However, when reproducing conditions are required with respect to the negative images whose exposure has been corrected at the time of photographing as described above, merely on the basis of densities or colors of the negative images, it is highly possible that the photographer's intention may not be reflected in the finish of the reproduced images.

Meanwhile, in accordance with another aspect of the present invention, in a case in which information indicating that exposure has been corrected when negative images are photographed is recorded on the information recording section, if the common reproducing conditions computing means corrects the common reproducing conditions in accordance with the exposure correction amount which has been corrected at the time of photographing negative images and indicated by the information, it is highly possible to obtain reproduced images having a finish which satisfies the photographer's intention even from the negative images each of which exposure has been corrected at the time of photographing.

Further, in a case in which negative images each of which density is excessively high or low is included in a plurality of images to be reproduced under the same reproducing conditions, when the negative images are reproduced under the same reproducing conditions, the reproduced images often represent density value of excessively high or excessively low. However, it is difficult to consider the images thus obtained to have a finish which meets the photographer's intention. It is better to reproduce the negative images whose density is excessively high or low among a plurality of negative images under the reproducing conditions in accordance with the density of the negative images. Accordingly, it is highly possible that the finish of the reproduced images can be approximate to the finish which has been desired by the photographer's intention.

In accordance with an essential aspect of the present invention, a method of determining reproducing conditions comprises the steps of: reading information recorded on information recording section of a photographic film; selecting from a plurality of negative images recorded on the photographic film, negative images to be reproduced under the same reproducing conditions, on the basis of the information read from the information recording section; and determining reproducing conditions which are commonly used for the selected plurality of negative images in accordance with a density control amount on the basis of a film base density and a reference density value of a photographic film, and a color control amount on the basis of a color balance value which is determined from a plurality of negative images. Accordingly, reproduced images having proper finish can be obtained with high possibility from a plurality of images which are instructed to be reproduced under the same reproducing conditions.

In accordance with the aforementioned aspect, since a color control amount on the basis of a color balance value which is determined by metering a large number of negative images recorded on a photographic film of the same type as the photographic film having negative images to be reproduced is used as the color control amount, a control amount which corrects a color balance among the reproduced images can be obtained in accordance with the color balance which is different for each type of films. As a result, color failure can be prevented from being caused to the images to be reproduced and the color of photographic light source can be reproduced as it is.

BRIEF DESCRIPTION OF THE DRAWINGS

FIG. 4 is a diagram illustrating an example of a normalized curve of a density value for determining a color control amount.

DESCRIPTION OF THE PREFERRED EMBODIMENT

The embodiments of the present invention will be described in detail with reference to the accompanying drawings.

First Embodiment

Figure 1:
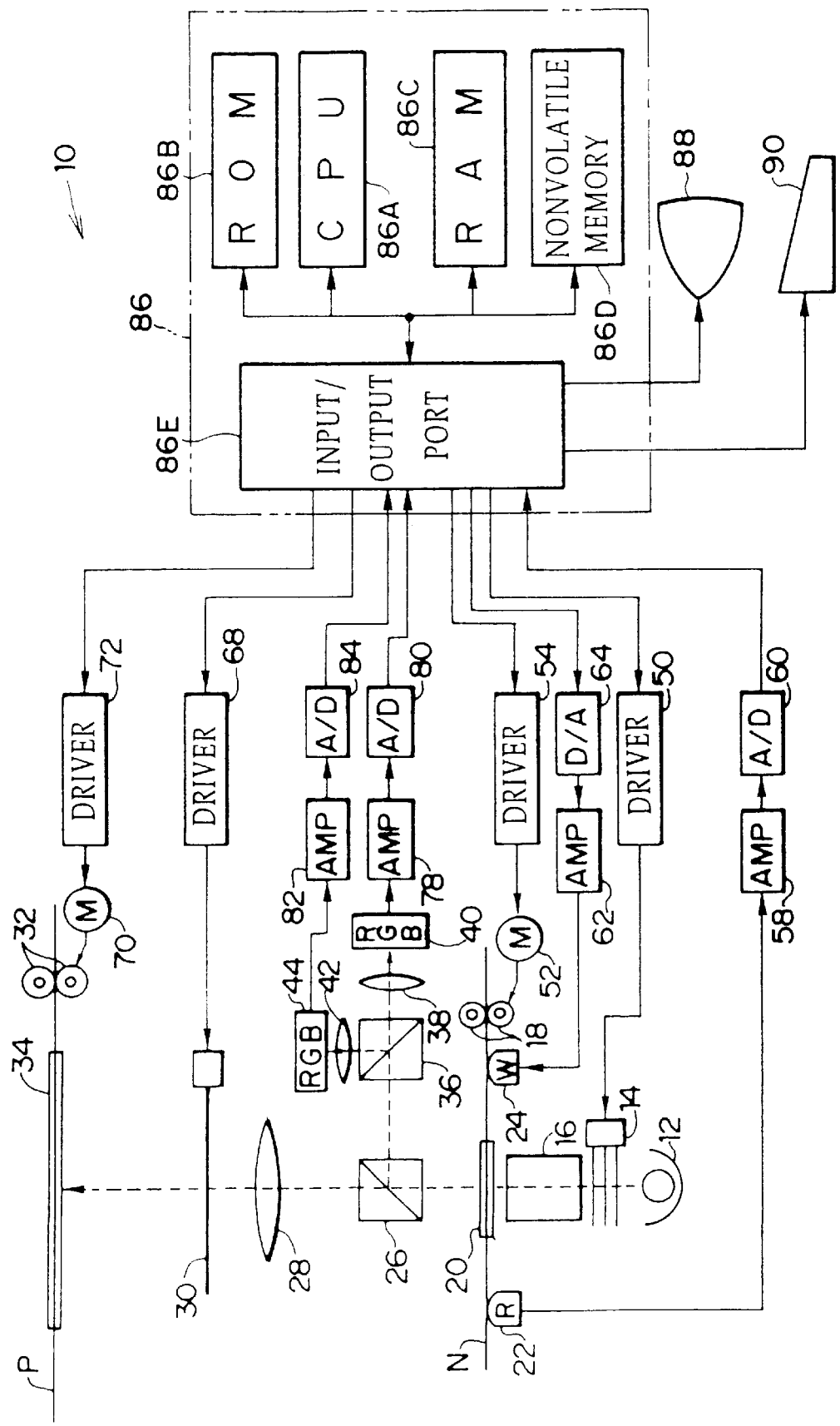
FIG. 1 is a schematic structural view of a printer according to the present invention.

FIG. 1 shows a printer 10 as a reproducing machine of the present invention. The printer 10 has a light source 12 which projects exposure light for printing the images recorded on a negative film N. A color compensating filter 14 which comprises three filters of C(cyan), M(magenta), and Y(yellow) which can move independently along an optical path of the exposure light, and a diffusion box 16 which diffuses the light transmitted through the color compensating filter 14 are sequentially disposed at the light projecting side of the light source 12. The color compensating filter 14 is connected to an input/output port 86E (I/O port) of a controller 86 via a driver 50, and the movement of each of the three filters within the color compensating filter 14 is controlled by the controller 86.

Further, a transport path of the negative film N is provided above the diffusion box 16 and a pair of transport rollers (hereinafter referred to "transport roller pair") 18 which transport the negative film N at a position which is slightly spaced apart the optical path of the light source 12. The transport roller pair 18 are connected to the drive shaft of a motor 52 and are rotated by receiving the driving force which is conveyed from the motor 52, and transports the negative film N. The motor 52 is connected to the I/O port 86E of the controller 86 via a driver 54 and the driving thereof is controlled by the controller 86. A negative mask 20 is disposed above the diffusion box 16 which corresponds to the optical axis of the light source 12.

Figure 2:
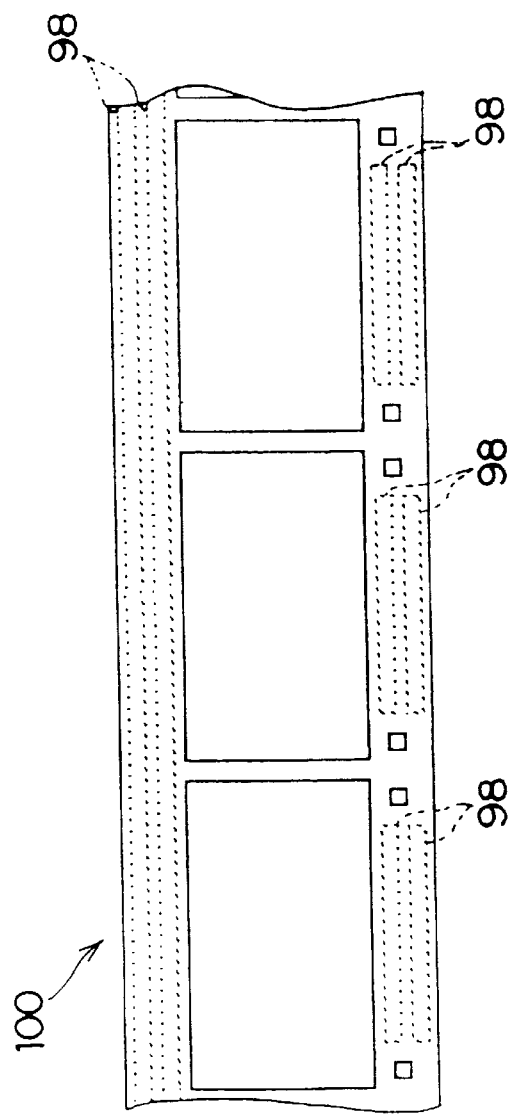
FIG. 2 is a plan view of a negative film.

In the printer 10 according to the present embodiment, a transparent magnetic material is coated over the entire surface of a film as the negative film N at the opposite side of the surface on which an emulsion layer is formed(i.e., emulsion layer forming surface), and a magnetic layer is formed. And as shown in FIG. 2, a negative film 100, in which magnetic tracks 98 (which corresponds to an information recording section of the printer 10 according to the present invention) are formed within a range other than the image recording range of the film for magnetically recording information, is set in the printer 10.

Previously, information about the type of a film is magnetically recorded on the magnetic tracks 98 of the negative film 100. Further, when an image is photographed and recorded by a camera, photograph information about the intensity of a subject, magnification rate for photographing, flash conditions, the date of photographing, the time of photographing, and so on, and information for identifying the type of the camera are magnetically recorded on the magnetic tracks 98. Moreover, in the magnetic tracks 98, in a case in which the images photographed and recorded onto the negative film 100 contain images which are to be exposed at the same exposure amount, an FTPM signal, or a Series Scene signal (details thereof will be described later) is recorded by a user in the magnetic tracks 98 via a camera.

Further, a reading head 22 and a writing head 24 are disposed so as to correspond to the magnetic tracks 98 of the negative film 100 along the transport path, interposing the negative mask 20 between the reading head 22 and the writing head 24. The reading head 22 corresponds to the reading means of the present invention. More specifically, the reading head 22 is connected to the I/O port 86E of the controller 86 via an amplifier 58 and an analog-digital converter (which is referred to an A/D converter hereinafter). A signal, which is outputted from the reading head 22 by reading information magnetically recorded on the magnetic tracks 98 of the negative film 100, is amplified by the amplifier 58, converted into digital data by the A/D converter 60, and is then inputted into the controller 86.

Further, the writing head 24 is connected to the I/O port 86E of the controller 86 via an amplifier 62 and a digital-analog converter 64 (which is referred to as a D/A converter hereinafter). When information supposed to be written into the magnetic tracks 98 of the negative film 100 is outputted from the controller 86, the information is converted into an analog signal by the D/A converter 64 and is amplified by the amplifier 62, and is then inputted into the writing head. Accordingly, the information is magnetically recorded onto the magnetic tracks 98.

A prism 26 for distributing light which has been transmitted through the negative film N in two directions is disposed above the negative mask 20. An exposure lens 28 and a black shutter 30 are sequentially disposed on the optical axis (exposure optical axis) of the light which has been distributed in one of the two directions. The black shutter 30 is connected to the I/O port 86E of the controller 86 via the driver 68 and the switching of the shutter 30 is controller by the controller 86.

A transport path of a printing paper P is disposed above the black shutter 30 and a transport roller pair 32 for transporting the printing paper P are provided at a position which is slightly spaced apart from the optical axis of the exposure light. The transport roller pair 32 are connected to the drive shaft of a motor 70 and are rotated by the driving force of the motor 70 being conveyed to the motor 70 so as to transport the printing paper P. The motor 70 is connected to the I/O port 86E of the controller 86 via the driver 72 and the driving thereof is controlled by the controller 86. A paper mask 34 is disposed above the black shutter 30 so as to correspond to the exposure optical axis.

Further, at the side to which the light distributed by the prism 26 is projected in the other of the above two directions, a prism 36 is disposed for receiving and distributing the thus projected light from the prism 26 in further two directions. An imaging lens 38 and a photometer 40 serving as photometric means are sequentially disposed on the optical axis of the light which has been distributed by the prism 36 in one direction.

The photometer 40 has a large number of light receiving elements arrayed in the form of matrix. The light transmitted through the image recording area on the negative film N is projected on a light receiving surface of the photometer 40 and the image recording area on the negative film N is divided into a large number of picture elements, and the picture elements are decomposed into respective component colors of R, G, B so as to effect a metering process. The photometer 40 is connected to the I/O port 86E of the controller 86 via an amplifier 78 and an A/D converter 80 and the signal indicating the photometric results outputted from the photometer 40 is amplified by the amplifier 78 and converted into digital data by the A/D converter 80 and inputted into the controller 86.

An image forming lens 42 and a CCD sensor for photographing 44 are sequentially disposed on the optical axis of the light which has been distributed by the prism 36 in the other direction. The light transmitted through the image recording area of the negative film N is projected to the CCD sensor 44 and the image recording area on the negative film N is divided into a large number of picture elements, and the picture elements are decomposed into respective component colors of R, G, B so as to effect a photographing. The CCD sensor 44 is connected to an amplifier 82 and connected to the I/O port 86E of the controller 86 via an A/D converter 84 and the photographing signal outputted from the CCD sensor 44 is amplified by the amplifier 82 and converted into digital data by the A/D converter 84 and inputted into the controller 86.

The controller 86 is provided with a CPU 86A, a ROM 86B, a RAM 86C, a nonvolatile memory 86D and the I/O port 86E, which are connected to one another via buses. A display 88 consisting of an LCD or a CRT, and a key board 90 such as a ten-key board through which various types of information are inputted by an operator are connected to the I/O port 86E. For example, an EEPROM, a RAM which is connected to a back-up power source or the like can be employed as the nonvolatile memory 86D.

Next, as an operation of the first embodiment, a description of a printing process, which is effected at CPU 86A of the controller 86 when the negative film 100 is set at the printer 10, will be given with reference to a flow chart shown in FIGS. 3A, 3B.

In Step 200, the transport roller pair 18 are driven via the motor 52, the negative film 100 is transported in a predetermined direction, and information magnetically recorded on the magnetic tracks 98 of the negative film 100 is read by the reading head 22. The information read by the reading head 22 is converted into digital data via the A/D converter 60 and inputted to the controller 86, and stored in RAM 86C or the like of the controller 86.

Next, in Step 202, the light source 12 is illuminated and the transport roller pair 18 are driven via the motor 52, and the negative film 100 is transported in the reverse direction of the predetermined transport direction. In Step 204, it is judged whether negative images have arrived at a photometric position (which is a position corresponding to the optical axis of the light source 12). When the judgment is negative, the routine returns to Step 202 at which the transporting of the negative film 100 is continued. If the judgment in Step 204 is affirmative, in Step 206, the transporting of the negative film 100 is stopped so that the negative images are positioned at the photometric position.

In Step 208, the negative images positioned at the photometric position as described above are metered by the photometer 40 and data inputted from the photometer 40 via the amplifier 78 and the A/D converter 80 are converted into photometric data indicating density values of the negative images for respective pixel elements, and stored in RAM 86C or the like. In Step 210, it is judged whether all of the negative images on the negative film 100 have passed the photometric position. When the judgment is negative, the routine returns to Step 202 in which the positioning process and metering process are iterated to the negative images for which metering process has not yet been effected. When the metering process has been completed for all the negative images and the judgment in Step 210 becomes affirmative, the routine goes to Step 212.

In Step 212, on the basis of the information read from the magnetic tracks 98 in Step 200, it is judged whether there are any negative images to be exposed by the same exposure amount among each of the negative images recorded on the negative film 100. The judgment can be effected in such a manner as described below.

Namely, in a case in which it is desired by a user that all of the negative films recorded on the negative film 100 are exposed by the same exposure amount, FTPM signal is magnetically recorded on the magnetic tracks 98 by the user. For this reason, in a case in which, FTPM signal is included in the information read from the magnetic tracks 98, it is determined that there exist negative images to be exposed by the same exposure amount (the judgment in Step 212 is affirmative), and that all of the negative images on the negative film 100 are supposed to be exposed by the same exposure amount.

Or in a case in which it is desired by a user that some of the negative images recorded on the negative film 100 (a series of negative images) be exposed by the same exposure amount, a series scene signal is magnetically recorded on the magnetic tracks 98 corresponding to the positions of the front end image and the rear end image within the series of negative images. For this reason, in a case in which a series scene signal is included in the information read from the magnetic tracks 98, it is determined that there exist some negative films to be exposed by the same exposure amount (the judgment in Step 212 is affirmative), and that a series of negative images which can be judged from the recording position of the series scenes are to be exposed by the same exposure amount.

Further, even in a case in which an indicating signal such as FTPM signal, a series scene signal or the like is not magnetically recorded on the magnetic tracks 98, it is possible to automatically judge whether or not there are any negative images to be exposed by the same exposure amount on the basis of other information such as photographing information or the like which are magnetically recorded on the magnetic tracks 98.

For example, when a plurality of negative images which have little difference in photographing times at which the negative images were photographed, and whose conditions for outputting electronic flash, magnifications, brightness or the like are similar or close to each other are formed on a single negative film, there are relatively high possibilities that these images are those having photographed similar scenes, or those to be exposed by the same exposure amount. Further, in a case in which image characteristic amounts of negative images (e.g. a mean density or the like of image screens) which are determined by the data obtained by metering the negative images in Step 208 are similar to each other, it can be understood with a high degree of possibility that the negative images are to be exposed by the same exposure.

In this way, photographing conditions or image characteristic amounts for respective negative images recorded on the negative film 100 have been compared to each other and in a case in which a plurality of the negative images approximate to each other in terms of photographing conditions or image characteristic amounts, it may be determined that there exist negative images which are to be exposed by the same exposure amount (the judgment in Step 212 is affirmative), and that a plurality of the negative images approximating to each other in terms of photographing conditions or image characteristic amount are those to be exposed by the same exposure amount. Moreover, in Step 212, when it is determined that there exist negative images which are to be exposed by the same exposure amounts, a method by which negative images to be exposed by the same exposure amount corresponds to selecting means according to the present invention.

If the answer is 'YES' in Step 212, the routine goes to Step 216 in which the content of DX code recorded on the side edge portion of the negative film 100 is judged on the basis of the results obtained by metering the side edge portion of the negative film 100 by the photometer 40, so that the type of the negative film 100 can be identified.

Next, in Step 218, a film base density $D_{BASE}$ of the negative film 100 is detected. More specifically, a non-image forming area (e.g. a side edge portion, a portion between negative images, or the like) on a negative film is metered by the photometer 40, and the resultant density of the non image forming area (or a mean value of densities of many portions within a non-image forming area) may be set as a film base density $D_{BASE}$. Or, the entire surface of the negative film 100 (including image recording area or non-image forming area) is metered by the photometer 40, and the lease density in each section on the film can be set as a film base density $D_{BASE}$. Further, among density values of respective portions on a negative film, the mean value of density values within a range which is assumed to correspond to an empty portion on the negative film, may also be set as a film base density $D_{BASE}$.

It is known that the film base density of a negative film varies due to the developing conditions during the development of the film. However, as described above, the value reflecting the developing condition during the development of the film can be obtained as a film base density $D_{BASE}$ if the film base density of the negative film having negative images on which exposure is to be effected is detected.

Moreover, film base density is detected over a multiple number of negative films in such a manner as described above, and the detected film base density of the respective negative films is stored and accumulated in non volatile memory 86D or the like so as to correspond to the type of the film. Accordingly, the mean value of film base densities of a multiple number of negative films of the same type as the film type identified in Step 216, or the weighted mean value of the aforementioned mean value and the film base density detected from the negative film including the negative images to be exposed can be set as the film base density $D_{BASE}$. In this case, the value reflecting the developing conditions during the development of the negative film on which negative images are exposed cannot necessarily be obtained as a film base density $D_{BASE}$. However, the value of film base density peculiar to each type of films can be obtained with high accuracy.

Next, in Step 220, a predetermined reference density value $D_{REF}$ is inputted, and the density control amount DX can be computed and determined by adding the reference density value $D_{REF}$ to the film base density $D_{BASE}$ which has been detected in Step 218 (see the following equation (1)). A mean density value of a large number of negative images (but film base density is not included) can be employed as a reference density value $D_{REF}$. Moreover, a fixed pattern image (e.g. an image having a fixed density corresponding to a color tone such as gray) may be printed previously at a specified position of the film, for example, at the front end or rear end portion of the film and the density resulting from metering the pattern image may be used as a reference density value $D_{REF}$. Steps 216 through 220 correspond to density control amount determining means according to the present invention.

$$DX = D_{BASE} + D_{REF} \quad (1)$$

In the present first embodiment, a color balance value for each of a large number of negative images is determined. Namely, a color balance value CMj (j expresses one of R, G, B) expressing the mean color balance among many negative images is determined previously for each type of negative films and the color balance value CMj is stored previously in the nonvolatile memory 86D. Next, in Step 222, a color balance value CMj for a negative film of the same type of film as the film type which is identified in Step 216 is inputted from the nonvolatile memory 86D, and the color balance value for each of the plurality of negative images which are to be exposed (which, in fact, may be only the negative images which are to be exposed by the same exposure amount, or may include negative images which are to be exposed by the individual exposure amount) is determined, and a color balance value Cmj expressing a mean color balance for each of the negative images to be exposed is computed.

Thereafter, the weighted mean value as a color control amount DYj (j represents one of R, G, B) of a color balance value Cmj expressing a mean color balance for each of the negative images to be exposed, and a color balance value CMj for a negative film of the same type of film as the film type inputted from the nonvolatile memory 86D is computed (see the following equation (2)). It is to be noted that preferably each of color balance values CMj and Cmj can be determined by the pixels other than those having high color saturation in each of negative images.

$$DYj = \alpha_1 \cdot Cmj + \alpha_2 \cdot CMj \quad (2)$$

Further, in the equation (2), the value of one of the weighting factors $\alpha_1$ and $\alpha_2$ may be zero(0) and changes depending upon the conditions (for example, the smaller the number of the negative images to be exposed by the same exposure amount becomes, the larger the weighting of the mean color balance value CMj among many negative images becomes (the value of the weighting factor $\alpha_2$ is made to be larger)). In addition, one of the color balance values CMj and Cmj, or a color balance value determined by negative images which are selected among negative images to be exposed by the same exposure amount on the basis of the predetermined reference is used for the color control amount DYj.

Further, for example, as shown in FIG. 4, a normalization curve representing the relationship among respective density (the color balance) of color components R, G, B is determined (FIG. 4 shows a normalization curve representing the relationship between a mean value Dr of density Dg and R density, and a mean value Db of B density on the basis of, for example, a mean value Dg of G density. However, a normalization curve may be employed on the basis of mean density of 3 colors Dm and a weighted mean density of 3 colors). Accordingly, a color control amount DYj may be determined by a normalization curve on the basis of a mean value Dg or a mean density Dm of 3 colors or a weighted mean density of 3 colors.

For example, when a normalization curve which is shown in FIG. 4 is used, each of a density Dr and a density Db is determined from a density Dg, and a normalized density value DR, DG, DB can be determined in accordance with the following equation (3). Further, densities Drg, Dbg correspond to a color control amount Dyj. Moreover, a density value Dw in the equation (3) can be used as a density control amount DX.

$$\left.\begin{aligned} Drg &= Dr - Dg \\ Dbg &= Db - Dg \\ DR &= Dw + Drg \\ DB &= Dw + Dbg \\ DG &= Dg \end{aligned}\right\} \quad (3)$$

The above described Step 222 corresponds to color control amount determining means of the present invention. In the next Step 224, on the basis of the density control amount DX and the color control amount DYj which are computed as described above, a common exposure amount $E_0j$ is computed in accordance with the following equation (4) and the resulted common exposure amount $E_0j$ is stored in RAM 86C or the like.

$$\log E_0j = DX + DYj + Kj \quad (4)$$

wherein Kj is a fixed number which is determined by the type of printing paper P, the type of printer, the enlargement magnification, the quantity of exposure light projected from the light source 12, or the like. Step 224 corresponds to common reproducing conditions computting means.

In Step 226, it is judged whether there is any negative images to be exposed by individual exposure amount in the entire negative images. If the judgment is negative, the routine goes to Step 270. However, if the judgment is affirmative, the routine goes to Step 228 in which on the basis of the screen mean density or the like of the negative images to be exposed by the individual exposure amount, an individual exposure amount Ej is computed for each of the negative images to be exposed by the individual exposure amount and is stored in RAM 86C or the like, and thereafter the routine goes to Step 270.

On the other hand, in Step 212, when it is determined that there are no negative images to be exposed by the common exposure amount in the entire negative images (if the answer is 'NO' in Step 212), in the same manner as the previous Step 228, after the individual exposure amount has been computed for each of the negative images, the routine goes to Step 270.

In Step 270, the negative film 100 is transported in a predetermined direction. In Step 272, it is determined whether the negative film has arrived at the exposure position (the position corresponds to the optical axis of the light source 12: the position is the same as the position at which negative images are metered). If the answer is 'NO', the routine returns to Step 270 in which the printer 10 goes on transporting the negative film 100. When the negative images have arrived at the exposure position, the judgment is affirmative in Step 272, and the printer 10 stops transporting the film 100 in Step 274.

Next, in Step 276, it is determined whether a negative image positioned at a photometric position must be exposed by the same exposure amount. If the answer is 'YES', the routine goes to Step 278 in which the respective operations of the color correction filter 14 and the black shutter 30 are controlled, and the negative image positioned at the exposure position is printed on the printing paper P on the basis of the common exposure amount $E_0j$ which has been computed in the previous Step 224. Thereafter, the routine goes to Step 282. This Step 278 corresponds to reproducing control means of the present invention.

Further, if the answer is 'NO' in Step 276, the routine goes to Step 280 in which the operations of the color correction filter 14 and the black shutter 30 are controlled, and the negative image positioned at the exposure position is printed on the printing paper P on the basis of the individual exposure amount Ej corresponding to the negative image, which is computed in the previous Step 214 or Step 228. Thereafter, the routine goes to Step 282.

In Step 282, it is determined whether all of the negative images which are recorded on the negative film 100 have passed the exposure position, that is, all of the negative images have been printed on the printing paper P. If the answer is 'NO', the routine returns to Step 270 and Steps 270 through 282 are repeated. When all of the negative images are printed on the printing paper P, the answer is 'YES' in Step 282 and the routine goes to Step 284 in which the negative film 100 is transported in the reverse direction of the transport direction, and thereafter, terminates the process.

In this way, in the present first embodiment, with reference to a plurality of negative images to be exposed by the same exposure amount, a common exposure amount $E_0j$ is computed on the basis of the density control amount DX which can be determined by adding the reference density value $D_{REF}$ to the film base density $D_{BASE}$, and the color control amount DYj which is a weighted mean value of a mean color balance (Cmj) of a plurality of negative images to be exposed and a mean color balance (CMj) of a large number of negative images recorded on the negative films of the same type. Accordingly, print images with a proper finish, which are not affected by density failure and in which the photographer's intention is being reflected, can be obtained with a high degree of possibility from a plurality of negative images to be exposed by the same exposure amount.

Further, in the above-described present first embodiment, a description of a method by which the reference density value $D_{REF}$ is made to be a fixed value and the common exposure amount $E_0j$ is determined with respect to a plurality of negative images to be exposed by the same exposure without considering various types of differences among the negative images. However, with reference to a second and subsequent embodiments of the present invention, a description of a method by which a common exposure amount $E_0j$ is determined by partly correcting various types of differences among negative images on the basis of the image characteristic amount, the photographing information, or the like of a negative image will be given.

Second Embodiment

A description of the aforementioned second embodiment will be explained hereinafter. Further, since the present second embodiment has the same structure as the first embodiment, portions identical to those shown in the previous embodiment are denoted by the same reference numbers, and a description thereof will be omitted.

Figure 3A:
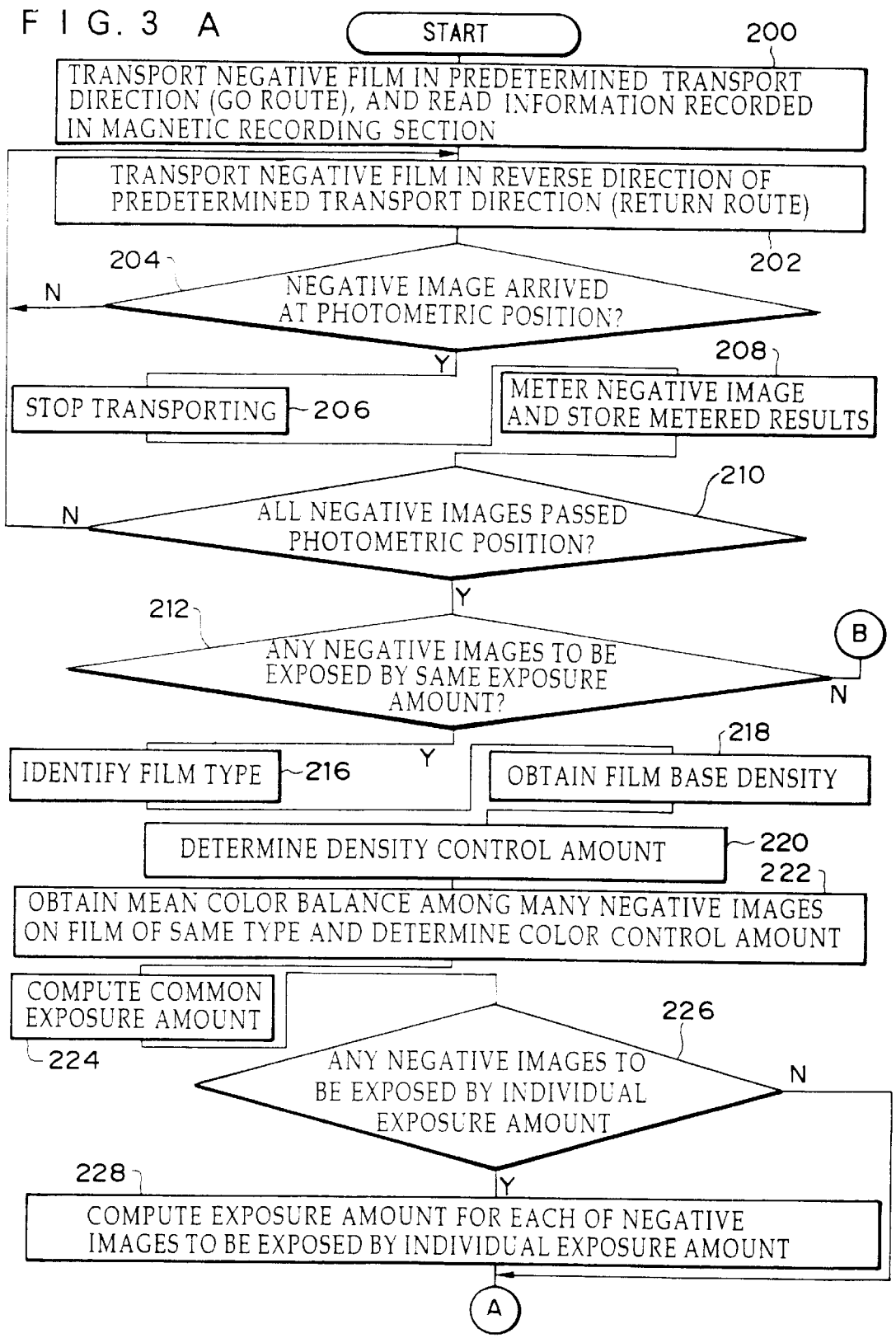
FIG. 3A is a flow chart showing a printing process according to a first embodiment.
Figure 3B:
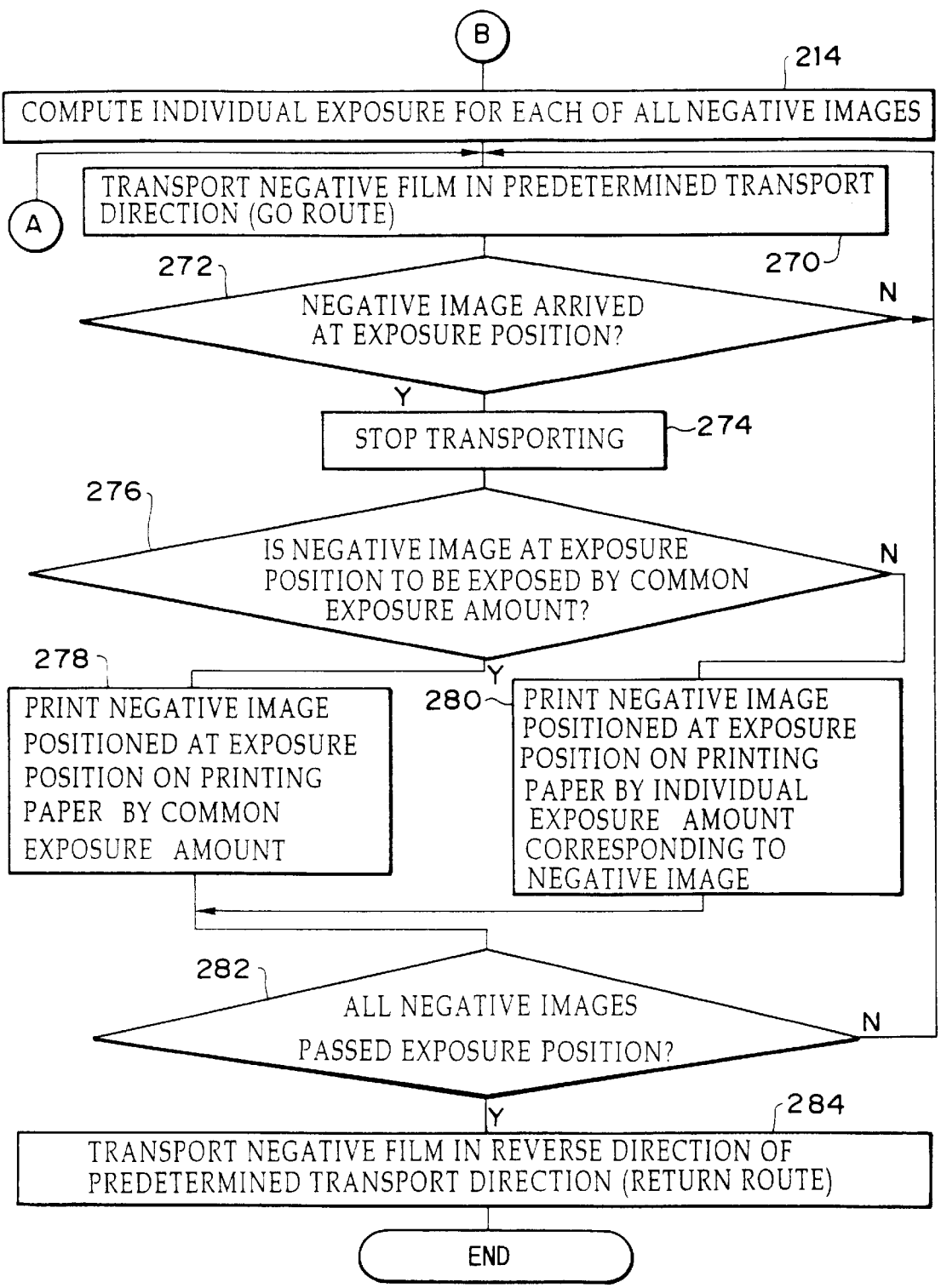
FIG. 3B is a flow chart related to FIG. 3A showing a printing process according to a first embodiment.
Figure 5:
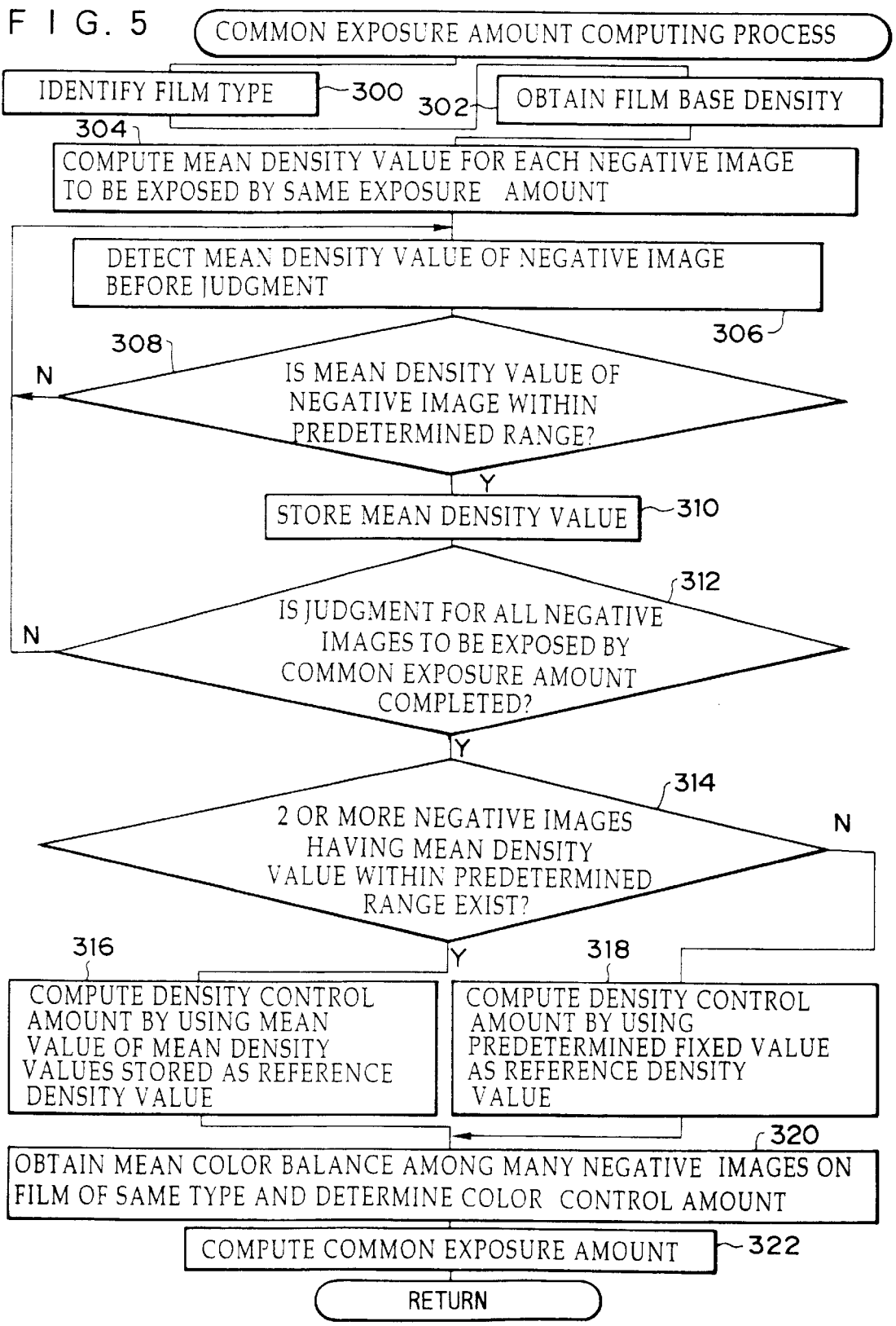
FIG. 5 is a flow chart showing a common exposure amount computing process according to a second embodiment.

In accordance with the present second embodiment, instead of Steps 216 through 224 (i.e., common exposure amount computing process) in the flowchart in FIG. 3A, a common exposure amount computing process which is shown in FIG. 5 is effected. Namely, in the same manner as Steps 216 and 218 in the flowchart in FIG. 3A, in Steps 300 and 302, the film type is detected and the film base density $D_{BASE}$ is determined.

In Step 304, a mean value Dm is computed for each of the plurality of negative images to be exposed by the same exposure. In Step 306, among all of the negative images to be exposed by the same exposure, a mean density value Dm of the negative images whose mean density value have not yet been determined is detected. In the next Step 308, it is determined whether a mean density value Dm of a negative image is within a predetermined range. The predetermined range is specified as expressed in the equation (5).

$$(\text{reference value } D_N-0.07) < Dm < (\text{reference value}+0.07) \qquad (5),$$

wherein a reference value $D_N$ is a reference value of negative density. For example, negative density provided when a gray plate having 18% of negative density is photographed on a predetermined film by a predetermined camera can be employed. By the way, the change of density on the negative image by 0.07% is equivalent to the change caused when a so-called ⅓ stop of the exposure amount of the camera is applied, and when the negative image is exposed by the same exposure amount, the density on the print image changes by 20%.

If the judgment is affirmative in Step 308, the routine goes to Step 310 in which the detected mean density value Dm is stored in RAM 86C or the like, and the routine goes to Step 312. In Step 312, it is determined whether a mean density value Dm has been determined for all of the negative images to be exposed by the common exposure. When the judgment is negative in Step 312, the routine returns to Step 306, processes from Step 306 are iterated. Or if the judgment is negative in Step 308, it can be determined that the negative image corresponding to the determined mean density value Dm is an abnormal frame which may have an abnormal high or low density. Accordingly, it is not necessary to store the mean density value Dm, and the routine goes to Step 306 and the processes from Step 306 will be repeated.

When the aforementioned process is effected on all of the negative images to be exposed by the same exposure amount, the judgment is affirmative in Step 312 and the routine goes to Step 314 in which it is determined whether the number of the negative images having a mean density value Dm within a predetermined range is two or more. When the judgment is affirmative, the routine goes to Step 316 in which the mean value of the mean density value Dm which is stored in the previous Step 310 is computed and the resulted reference density value $D_{REF}$ and the film base density $D_{BASE}$ which has been determined in Step 302 are substituted in the previous equation (1) and the density control amount DX is computed and thereafter, the routine goes to Step 320.

In Step 320, a color control amount DYj is determined on the basis of the equation (2) in the same manner as Step 222 of the first embodiment. In Step 322, in the same manner as Step 224 in the first embodiment, a common exposure amount $E_0j$ is computed in accordance with the equation (4). Further, each of a plurality of negative images to be exposed by the same exposure amount is exposed by the common exposure amount $E_0j$.

In this way, in the present second embodiment, it is determined whether there are some negative images having a mean density value within a predetermined range with respect to a plurality of negative images to be exposed by the same exposure amount. When two or more negative images having a mean density value which is within a predetermined range, a density control amount DX is determined by making the mean value of the mean density value Dm of the negative images as the reference density value $D_{REF}$ so that $E_0j$ is computed and the plurality of negative images are exposed on the printing paper P on the basis of the common exposure amount $E_0j$. Accordingly, print images having proper finish, which are not effected by density failure and in which the photographer's intention is reflected, can be obtained with a high degree of possibility from a plurality of negative images to be exposed by the same exposure amount.

Further, as described above, the present second embodiment is structured such that a negative image which is used for computing a density control amount DX is selected from a plurality of negative images to be exposed by the same exposure amount, and the density control amount DX is computed by using a mean value of a mean density value Dm of the selected negative images. However, the present invention is not limited to this, and the density control amount DX can be computed by using a weighted mean value of a mean density value Dm for each of the plurality of negative images. In this case, a weighted factor for the mean density value Dm for each negative image can be determined such that the weight of the mean density value Dm within a predetermined range becomes larger and the weight of the mean density value Dm out of a predetermined range becomes smaller.

Third Embodiment

Next, a description of a third embodiment of the present invention will be given. The present third embodiment has the same structure as the first and second embodiments. Accordingly, portions identical to those in the previous embodiments are denoted by the same reference numerals, and a description thereof will be omitted, and an operation of the present third embodiment will be explained hereinafter.

Figure 6A:
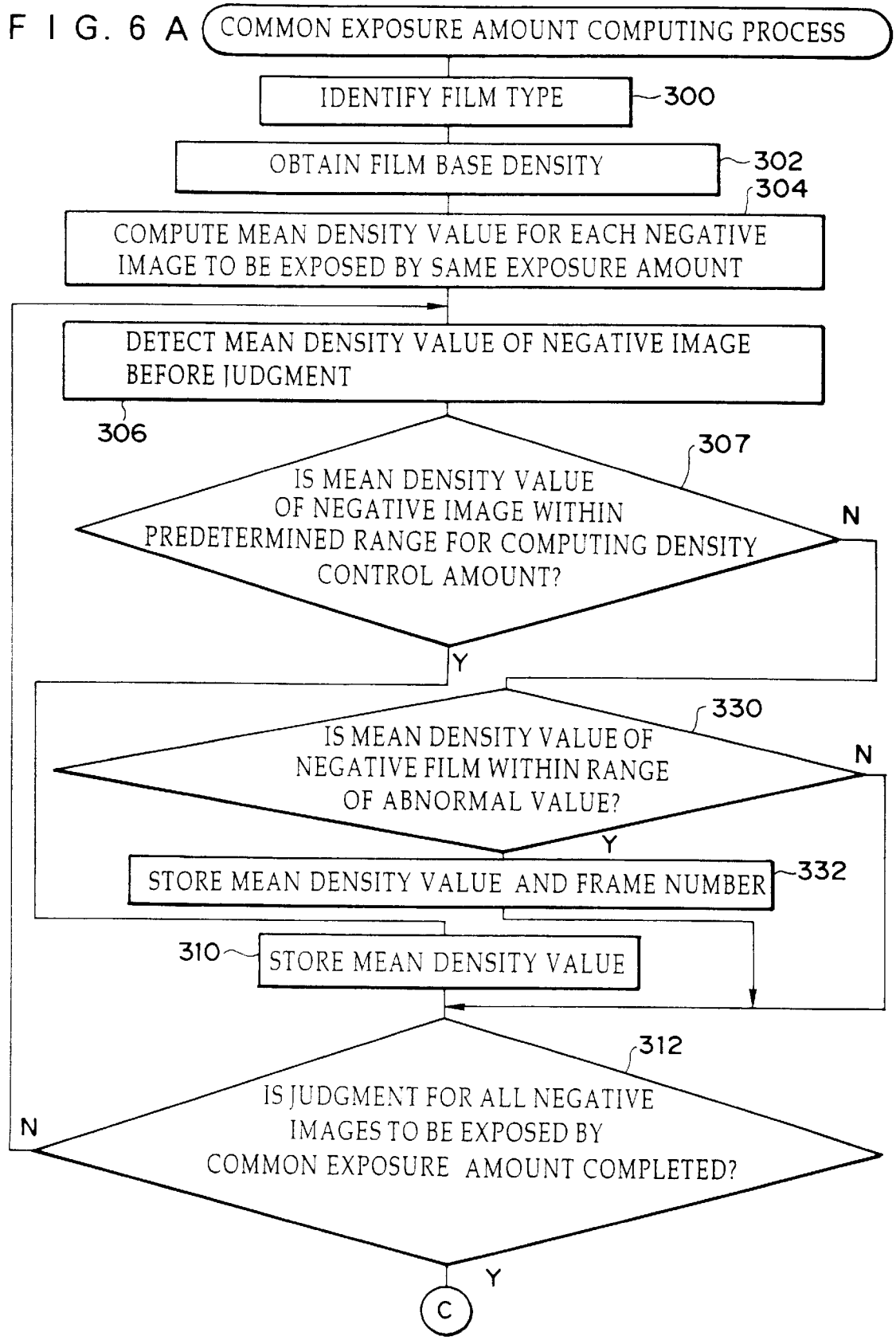
FIG. 6A is a flow chart showing a common exposure amount computing process according to a third embodiment.
Figure 6B:
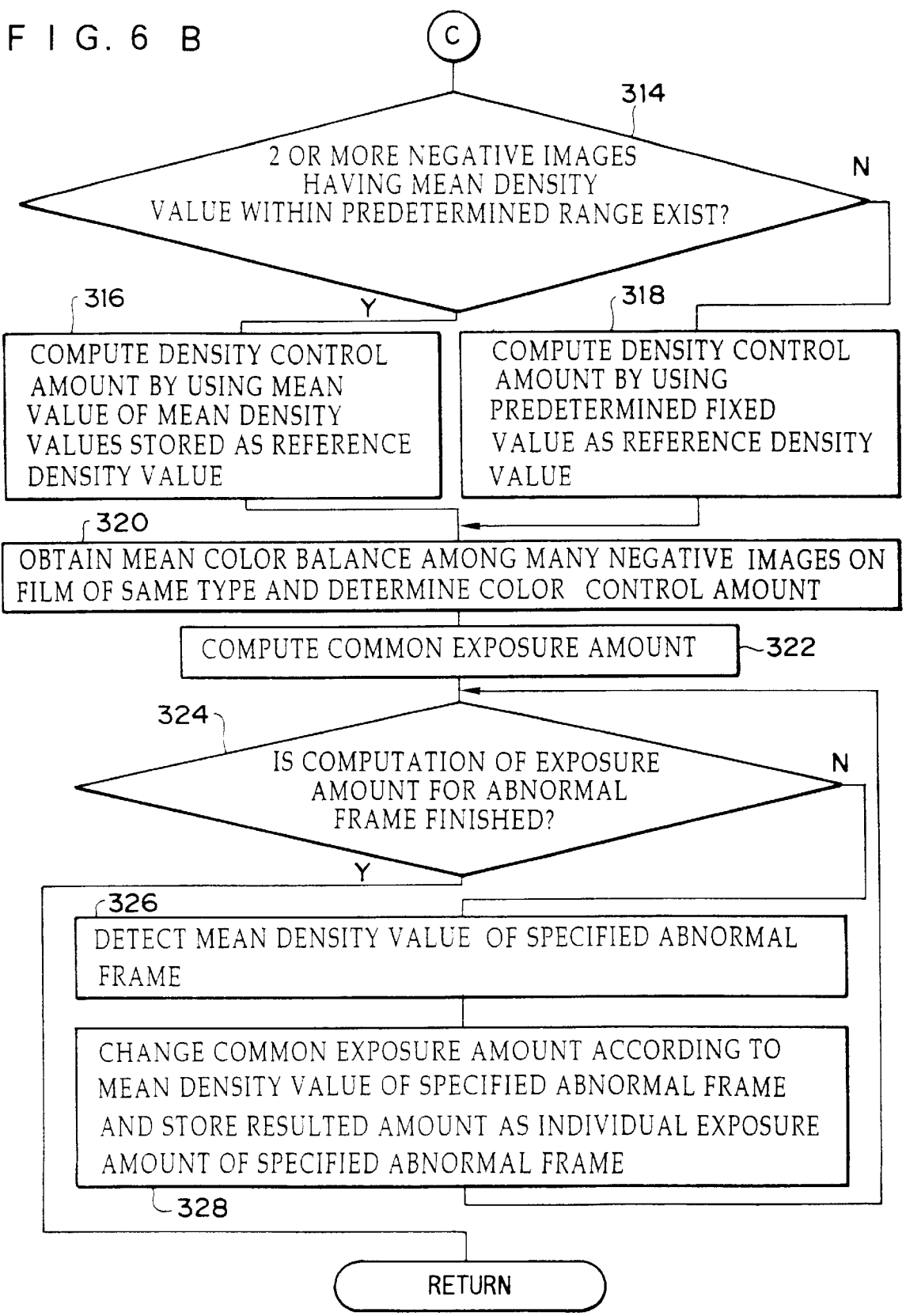
FIG. 6B is related to FIG. 6B, showing a common exposure amount computing process according to a third embodiment.

In the present third embodiment, instead of the process (common exposure amount computing process) in accordance with Steps 216 through 224 of the flowchart in FIG. 3A, which has been described in the first embodiment, a common exposure amount computing process which is shown in FIGS. 6A, 6B is effected. Only the points which are different from the common exposure amount computing process which has been described in the second embodiment will be described with regard to a common exposure amount computing process according to the third embodiment of the present invention.

In the third embodiment of the present invention, a film type is identified (Step 300), film base density $D_{BASE}$ is obtained (Step 302), a mean density value Dm for each of a plurality of negative images to be exposed by the same exposure amount is computed (Step 304), and thereafter, in Step 306, a mean density value Dm of negative images for which a mean density value has not yet been determined is detected. And in the next Step 307, it is determined whether the mean density value Dm is within a predetermined range for computing a density control amount. The range for computing a density control amount can be determined such that the negative images photographed and recorded in such a manner that a photographer has intentionally changed the exposure amount as he or she likes can be excluded. For example, the following equation (6) can be determined.

(a reference value $D_N-0.04$)<Dm>(a reference value $D_N-0.04$) (6)

The change of density of 0.04 on a negative image is equivalent to the change caused when a so-called ⅓ stop of the exposure amount of a camera is applied. The change of density which has been changed in accordance with the change of the exposure amount by a photographer's intention is generally more than a range which is determined in the equation (6). Accordingly, in a case in which the judgment is affirmative in Step 307, the routine goes to Step 310 in which the detected mean density value Dm is stored in RAM 868C or the like to use for computing a density control amount DX, and the routine goes to Step 312. The negative image in which a mean density value Dm is within a range for computing a density control amount, that is, the negative image in which the change of density with respect to a reference value $D_N$ is less than or equal to ⅓ stop in the exposure amount of the camera is not likely to be the one whose exposure amount has been changed and photographed intentionally by the photographer. Accordingly, a control amount which can correct variation in characteristics and developing conditions during the development process or the like, of a negative film can be obtained as a density control amount DX by determining the density control amount DX on the basis of the mean density value Dm of the negative image.

On the other hand, in a case in which the judgment is negative in Step 307, the routine goes to Step 330 in which it is determined whether a mean density value Dm is within a range of abnormal value. It can be determined that the range of the abnormal value is determined to be equivalent to a value which exceeds the limit of the density change due to the exposure amount which has been intentionally change by the photographer. For example, the following equation (7) can be determined.

$Dm$>(a reference value $D_N+0.10$), $Dm$>(a reference value $D_N-0.10$) (7)

Step 330 corresponds to the judgment according to claim 6 whether there is a negative image whose density is excessively high or excessively low. When the exposure amount of the camera is changed by about ½ of stop, the density of the negative film changes by about 0.10 and when it is exposed by the fixed exposure amount, the density of the print image changes by about 0.30. The change of density of 0.30 with respect to the density of a satisfied print image is close to a tolerance limit of density change in a print image. For this reason, when the judgment is affirmative in Step 330, the routine goes to step 332, and the detected mean density value Dm is stored in RAM 86C or the like as an abnormal value, together with information (e.g. a frame number) which identifies the negative image whose mean density value Dm is determined to be an abnormal value, and therefore the routine goes to Step 312. Further, in a case in which the judgment is negative in Step 330, the routine goes to Step 312 without effecting any process.

In Step 312, it is judged whether the judgment of a mean density value Dm for each of all the negative images to be exposed by the common exposure amount is completed. If the judgment is negative in Step 312, the routine goes to Step 306, and processes from Step 306 are repeated. After the aforementioned processes have been effected on all of the negative images to be exposed by the same exposure amount, the routine goes to Step 314 and a common exposure amount $E_0j$ is computed in Steps 314 through 322 in the same manner as the second embodiment.

Next, in Step 324, it is judged whether the computation of an exposure amount for an abnormal frame (a negative image whose mean density value Dm is determined to be within a range of an abnormal value in the previous Step 330) has been completed. In a case in which there is no abnormal frame in the negative film 100, the judgment is affirmative. Meanwhile, in a case in which there are some abnormal frames in the film 100, the judgment is negative and the routine goes to Step 326 in which a mean density value Dm of a specified abnormal frame among the mean density values stored in RAM or the like in Step 322 is detected, and in Step 328, a density control amount DX of the common exposure amount $E_0j$ is corrected on the basis of the difference between the mean density value Dm of the detected specified abnormal frame and the reference value $D_N$ so that an individual exposure amount Ej of the specified abnormal frame is computed. Thereafter, the computed exposure amount Ej is stored in RAM 86C or the like.

The process in Step 328 is effected and thereafter, the routine returns to Step 324, and Steps 324 through 328 are repeated until the judgment is affirmative in Step 324. These processes correspond to reproducing control means according to claim 7 of the present invention. Accordingly, an individual exposure amount Ej is computed for each negative image whose mean density value Dm has been judged to be within an abnormal value such that the density of a print image becomes a satisfactory value. In a case in which the judgment is affirmative in Step 324, the common exposure amount computing process according to the present third embodiment is completed.

In the present third embodiment, among a plurality of negative images to be exposed by the same exposure amount, the negative images whose mean density value Dm is out of a range of abnormal values are subjected to an exposure by the common exposure amount $E_0j$ which has been computed in Step 322. Accordingly, print images with proper finish in which dispersion in characteristics or developing conditions during the development process, or the like, of the negative film can be corrected and in which the photographer's intention is reflected can be obtained with a high degree of possibility from a plurality of the negative images which have been judged to be exposed by the same exposure amount.

Further, with respect to an abnormal frame (a negative image whose mean density value Dm is within a range of abnormal value), the abnormal frame is exposed by an individual exposure amount Ej which is computed for each negative image on the basis of a mean density value Dm for each of the negative images in Step 328. Accordingly, even in a case in which there is a negative image whose density is excessively high or low and has a value which is more than the limited value of the change of density due to the change of the exposure amount being effected intentionally by a photographer (user), print images having a proper density can be obtained from the aforementioned negative images.

Moreover, as described above, an individual exposure amount Ej is determined with respect to the negative images whose mean density value Dm are judged to be within abnormal values by correcting a density control amount DX of a common exposure amount $E_0j$ in accordance with the difference between a mean density value Dm and a reference value $D_N$. However, instead of this, an individual exposure amount Ej is determined with respect to the negative images whose mean density value Dm are judged to be within abnormal values by setting a fixed value as a mean density value Dm. For example, in a case of $Dm \geq D_N+0.10$, $Dm=D_N+0.10$, and in a case of $Dm \leq D_N-0.10$, $Dm=DN-0.10$. In this case, with respect to negative images whose mean density value Dm are more than or equal to about ½ stop in the exposure amount of the camera, an individual exposure amount Ej is determined by correcting a common exposure amount $E_0j$ by the amount of ±0.10 of the reference value. As a result, the aforementioned negative images are exposed by the individual exposure amount Ej.

Further, with respect to the negative images of whose mean density value Dm are judged to be within abnormal values, an individual exposure amount Ej may be determined by setting a weighted mean value of the density values as a mean density value Dm. For example, with respect to a negative image in which a mean density value Dm is $Dm \geq D_N+0.07$, a mean density value Dm is computed in accordance with the following equation (8), and with respect to a negative image in which a mean density value Dm is $Dm \leq D_N-0.07$, a mean density value Dm is computed in accordance with the following equation (9).

$$Dm=D_N+0.07+k(Dm-(D_N+0.07)) \quad (8)$$

$$Dm=D_N-0.07-(Dm-(D_N+0.07)) \quad (9)$$

wherein k is a factor and $k \leq 1.0$.

Fourth Embodiment

Figure 7:
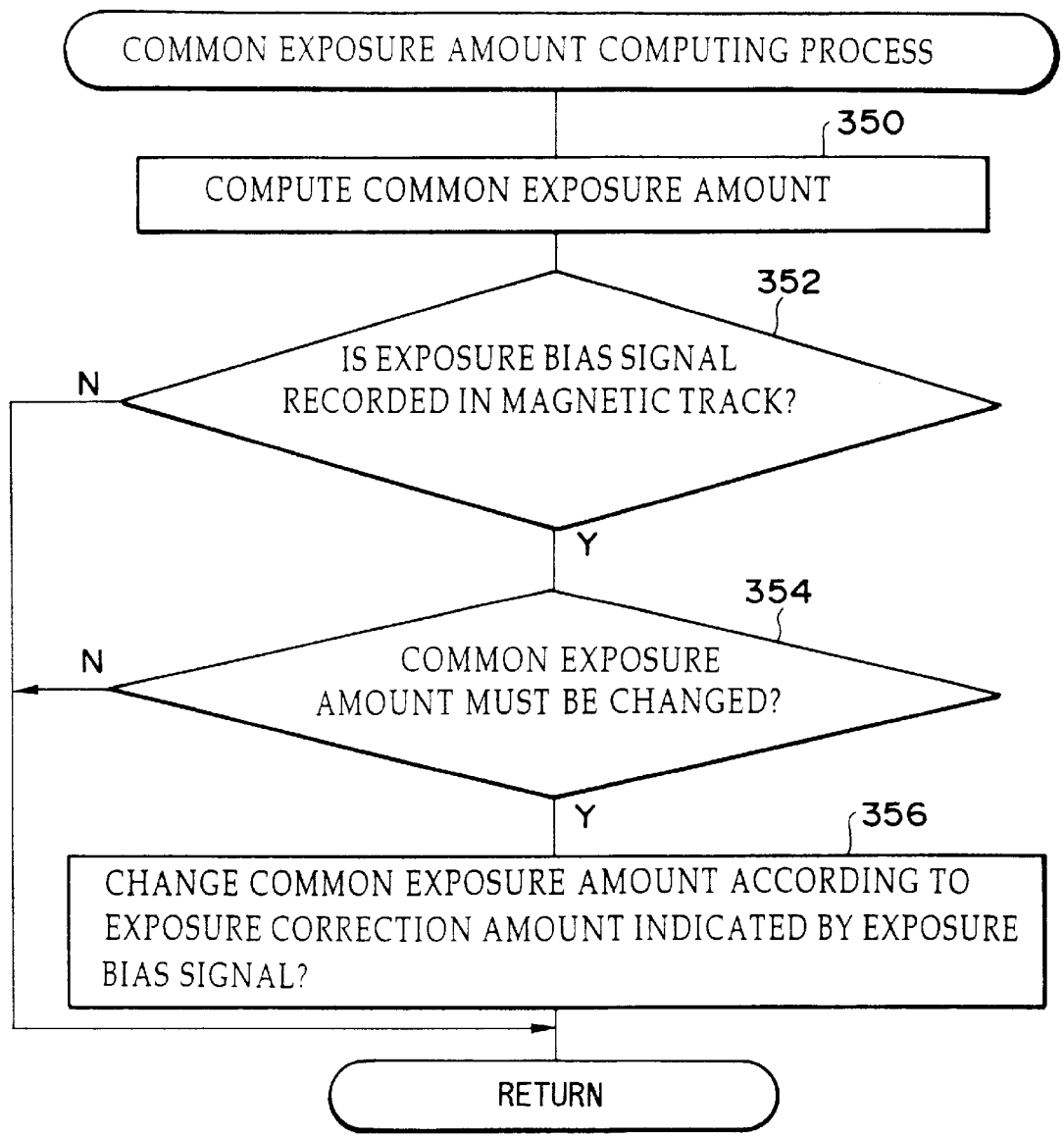
FIG. 7 is a flow chart showing a common exposure amount computing process according to a fourth embodiment.

Next, a description of a fourth embodiment of the present invention will be given. Further, since the present fourth embodiment has the same structure as the previous embodiments, portions identical to those in the previous embodiments are denoted by the same reference numerals, and a description thereof will be omitted, and as an operation of the present fourth embodiment, with reference to the flowchart in FIG. 7, a common exposure amount computing process will be explained hereinafter.

In Step 350, in the same manner as Steps 216 through 224 of the flowchart in FIG. 3A which has been explained in the first embodiment, and in the same manner as the common exposure amount computing process which has been explained in the second or third embodiment, a common exposure amount $E_0j$ is computed. In Step 352, it is judged whether an exposure bias signal has been recorded on the magnetic tracks 98 of the negative film 100. The exposure bias signal is a signal which is recorded on the magnetic tracks 98 in a case in which the exposure is corrected (changed) by a photographer and images are photographed and recorded on the negative film 100, and represents to what degree the exposure has been corrected.

When the judgment is affirmative in Step 352, the routine goes to Step 354 in which it is judged whether the common exposure amount $E_0j$ which has been computed in the previous Step 350 must be corrected. When the judgment is affirmative, the correction of the common exposure amount $E_0j$ is effected in Step 356.

The correction of exposure is effected to change the density of the image to be photographed intentionally. When the amount of exposure is increased, an overexposure is caused so that a slightly brighter print image (a so-called high key print image) can be obtained as a whole. Meanwhile, when the amount of exposure is decreased, an underexposure is caused so that a darker print image can be obtained. In a case in which the exposure correction amount, which can be detected by the exposure bias signal, is fixed for each of the negative images to be exposed by the same exposure amount, the judgment is affirmative in Step 354, and a common exposure amount $E_0j$ is changed in accordance with the exposure correction amount at the time of photographing and recording images on the negative film 100 in Step 356. In the present embodiment, a mean density value Dm can be corrected in accordance with 0.07× exposure bias amount (in which the change by the amount of 1 stop is 1.0) and the common exposure amount $E_0j$ can be determined.

Further, the exposure may often be corrected for each of the images to be photographed in order to effect the density correction at the time when scenes against the light or the like are photographed and recorded. In Step 354, as described above, depending upon whether the exposure correction has been effected or not, or in the case in which exposure correction amounts are different from each other for each of the images, on the basis of the exposure bias signal, the exposure correction amount for each image, which is expressed when each of a plurality of negative images to be exposed by the same exposure amount photographed and recorded, is detected individually. In order to obtain a print image with proper finish with the highest degree of possibility from a plurality of negative images to be exposed by the same exposure amount, it is judged whether or not the correction of a common exposure amount $E_0j$ must be effected on the basis of the detected exposure correction amount for each of the negative images. The judgment can be effected on the basis of a ratio in which negative images whose exposure amount has been corrected when photographed are included in a plurality of negative images to be exposed by the same exposure amount, or on the basis of an exposure correction direction or a magnitude of the exposure correction amount.

In a case in which the aforementioned judgment is affirmative, in Step 356, on the basis of the amount by which the detected exposure amount for each negative image has been changed, a correction amount for a common exposure amount $E_0j$ is computed for the purpose of obtaining a print image having proper finish from a plurality of negative images to be exposed by the same exposure amount with the highest possibility, and a common exposure amount $E_0j$ is corrected in accordance with the thus computed corrected amount of the detected exposure amount for each negative image. In a case in which a common exposure amount $E_0j$ is corrected as described above, exposure is effected on the basis of the corrected common exposure amount $E_0j$ in accordance with the amount by which the exposure amount is changed when the negative images are photographed and recorded. Accordingly, a print image having a finish in which a photographer's intention is reflected can be obtained with a high degree of possibility.

On the other hand, in a case in which the judgment is negative in Step 352 or 354, a common exposure amount computing process is finished. In this case, as a common exposure amount $E_0j$, the common exposure amount which has been computed in Step 350 is used.

Further, in the second and third embodiments of the present invention, an example in which a specified negative image is selected to be used for computing a density control amount DX on the basis of whether a mean density value Dm of a negative image is within a predetermined range has been described. However, the present invention is not limited to this, and generally, an individual exposure amount for each of negative images is computed by adding a base exposure amount which is determined in accordance with a mean density value or the like of the negative image to an exposure correction amount with respect to the base exposure amount. The exposure correction amount is a correction amount for correcting a base exposure amount such that the area corresponding to the main portion of a print should be densified and colored properly, and the correction amount due to the exposure correction amount increases as the difference between the density or color balance in the main portion of the negative image, and the entire density or color balance of the negative image becomes larger. Namely, in the negative image in which a standard scene without density failure or color failure is photographed and recorded, the correction amount due to the exposure correction amount is 0 or is close to 0. Accordingly, an exposure correction amount is computed, and the negative image in which a correction amount due to the computed exposure correction amount is 0 or is close to 0, may be selected as a specified negative image which is used for computing a density control amount DX or a common exposure amount $E_0j$.

In accordance with the aforementioned method of selecting a specified negative image, in a case in which a negative image which is recorded on the negative film 100 is the one photographed and recorded via so-called bracket exposure by which an image is photographed by gradually changing the exposure with respect to the same scene, as a specified negative image which is used for computing a common exposure amount, negative images other than the negative images which are apparently underexposed or the negative images which are apparently overexposed can be selected reliably.

More specifically, as disclosed in Japanese Patent Application Laid-Open (JP-A) No. 52-23936 or Japanese Patent Application Laid-Open (JP-A) No. 54-28131, as the amount of image characteristics which are highly correlated with the area corresponding to the main portion, maximum value, minimum value, a mean density of the entire surface of an area to be metered, a mean density of the central portion of the negative image, a mean density of a peripheral edge portion of the negative image, the difference of density among each of pixels of a negative image, or the like are computed from image data representing a negative image. On the basis of the computed amount of the image characteristics, a computing method of statistically determining the exposure correction amount can be employed for the computation of exposure correction amount. Further, an exposure correction amount may be computed such that a portion having the highest density, a hi-light portion, or a shadow portion, of the negative image can be densified and colored properly on a finished print.

An area corresponding to the main portion of the negative image (a face area corresponding to the face of a person photographed in the negative image) is extracted, and an exposure correction amount can be computed such that the area of the face can be densified and colored properly on a finished print. For example, as disclosed in Japanese Patent Application Laid-Open (JP-A) No. 52-156624, Japanese Patent Application Laid-Open (JP-A) No. 52-156625, Japanese Patent Application Laid-Open (JP-A) No. 53-12330, Japanese Patent Application Laid-Open (JP-A) No. 53-145620, Japanese Patent Application Laid-Open (JP-A) No. 53-145621, Japanese Patent Application Laid-Open (JP-A) No. 53-145622, or the like, a method of sampling a face area is effected such that on the basis of metered data due to the metering of negative image, it is judged whether each pixel is included in a range of skin color on the color coordinate, and the area in which a cluster (group) of pixels which are judged to be within a range of skin color can be extracted as a face area.

Moreover, as disclosed in Japanese Patent Application Laid-Open (JP-A) No. 4-346333, on the basis of the metered data by metering the negative image, histograms in accordance with a hue value (and a saturation value) are determined, and the determined histograms are divided for each of mountains of the histograms. Further, it is determined to which mountain of histogram each of the pixel points belongs and the pixels are classified into a group corresponding to the divided mountain. The negative image is divided into a plurality of areas for each group, the area corresponding to the area of face among the plurality of areas is assumed, and the assumed area may be extracted as the area of face.

Moreover, as described in Japanese Application Laid-Open Nos. 8-122944 and 8-184925, on the basis of metered data obtained by metering a negative image, one of configuration patterns (for example, a configuration pattern expressing contour of head, contour of face, inside structure of the face, contour of body or the like) specific to each of the portions of a person who is photographed in the negative image is detected. In accordance with the positional relationship between a predetermined portion of a person expressed by the magnitude, the orientation and the detected configuration pattern and the face of a person, the area which is assumed to correspond to the face of the person is set. Further, other configuration patterns which are different from the detected configuration pattern are detected so that the consistency of configuration patterns as the face of a person in the previously set area is determined and may be extracted as the area of a face.

Moreover, on the basis of the metered data obtained by metering the negative image, it is judged whether each of the pixels are within a range of a specified color (e.g. blue of sea or sky, green of lawn or tree, or the like) which is absolutely within a background on the color coordinate. The area in which a cluster (group) of pixels which are judged to be within the range of the specified color is determined to be the area corresponding to a non-main portion in the negative image and is removed. The remaining area can be extracted as the area (face area) corresponding to the main portion of the negative image. Or as disclosed above in Japanese Application Laid-Open No. 8-122944, and 8-184925, after the negative images have been divided into a plurality of areas, the amount of characteristics (ratio of linear portions to contours, degree of axial symmetry, the number of convex/concave portions, contact ratio of image to a white border around the image, density contrast within the area, the existence of density change pattern within the area or the like) is determined, and it is judged whether each of the areas is a non-main portion of the negative image, and the area which is judged to be non-main portion is removed, and the remained portion may be extracted as an area of the main portion (candidate area for a face).

Further, in this way, as a photographic film, an example of a negative film has been described. However, the present invention is not limited to this, and another photographic film such as reversal film or the like can be employed.

Moreover, an example of a so-called analogue type of printer in which an image is exposed by illuminating a light transmitted through a photographic film to a printing paper has been explained. However, the present invention is not limited to this, and can be applied to a printer implemented by a method in which an image is scanned and exposed by laser light which is modulated in accordance with the image, or a method in which an image is displayed on a display means such as liquid crystal panel, CRT or the like and the image is exposed by a light transmitted through the display means or a light projected from the display means (a so-called digital print method). Further, it is possible to apply the present invention to a printer in a case in which a negative image is reproduced (displayed) on a display screen of a display. Moreover, as a reproducing material, plain paper, an OHP(over head projector) sheet or the like other than printing paper can be used.

Moreover, even in a case in which there are a plurality of groups of negative images to be exposed by the same exposure amount in a single negative film (for example, in a case in which a group of images which are instructed by a series scene signal and a group of images in which scenes which are similar to the aforementioned group of images which are instructed by the series scene signal are photographed and recorded are mixed, or the like), the present invention can be employed. Further, the present invention can be adopted also in a case in which the same exposure amount should be applied to a plurality of negative films. Further, the images to be exposed by the same or similar exposure amount may be a plurality of images such as photographic images for scientific, medical, or industrial purposes, images which are photographed over a long or short period of time (for example, photographing of change of nature by a fixed point observation or the like), a plurality of images which are photographed under the same conditions, or the like.

As described above, the present invention is structured such that a plurality of negative images to be reproduced under the same reproducing conditions on the basis of the information read from a information recording section of a photographic film are selected, and a density control amount by which density of images to be reproduced is controlled is determined on the basis of film base density and reference density value, and a color control amount by which colors of the image to be reproduced are controlled is determined, common reproducing conditions are computed in accordance with a density control amount and a color control amount, and each of the selected plurality of negative images is reproduced under the same computed common reproducing conditions. As a result, an excellent effect can be obtained that a properly finished reproducing image can be obtained from a plurality of images which are instructed to be reproduced under the same reproducing conditions with a high degree of possibility. Further, in accordance with the present invention, since a color control amount which is determined on the basis of a color valance value which is determined by metering a large number of negative images recorded on a photographic film of the same type as the photographic film which reproduces a negative image is employed, by automatically correcting a film base density and a three-color balance which differ according to the film type, an excellent effect can be obtained that print conditions of a printer on use can be used without any changes, and the reproducing of density which is intended by a photographer can be reflected on the reproducing image as he or she desires.

Moreover, in accordance with the present invention, since with respect to negative images having excessively high or low density among a plurality of negative images to be reproduced under the same reproducing conditions, common reproducing conditions are corrected in accordance with the density of each of the negative images, and the images are reproduced under the corrected common reproducing conditions, en excellent effect can be obtained that even if there are negative images having excessively high or low density in a plurality of negative images to be reproduced under the same reproducing conditions, properly finished reproducing images can be obtained with a high degree of possibility.

What is claimed is:

1. A reproducing machine comprising:

reading means for reading information recorded on a photographic film and an information recording section of the photographic film;

selecting means for selecting, from a plurality of negative images recorded on said photographic film, negative images to be reproduced under common reproducing conditions, on the basis of the information read by said reading means;

density control amount determining means for determining a density control amount which controls a density of the negative images to be reproduced, on the basis of a film base density and a reference density of a photographic film;

color control amount determining means for determining a color control amount which controls colors of the negative images to be reproduced, on the basis of a color balance value which is determined by a predetermined number of negative images;

common reproducing conditions computing means for computing common reproducing conditions in accordance with the density control amount determined by said density control amount determining means and the color control amount determined by said color control amount determining means; and reproducing control means for reproducing a plurality of negative images, respectively, which are selected by said selecting means under the common reproducing conditions which are computed by said common reproducing conditions computing means.

2. A reproducing machine according to claim 1, wherein said density control amount determining means uses, as said photographic film base density, one of a value which is determined by metering a photographic film having negative images to be reproduced, and a value which is determined by metering a plurality of photographic films of a same type as said photographic film.

3. A reproducing machine according to claim 1, wherein said density control amount determining means further selects from a plurality of negative images selected by said selecting means, specified negative images corresponding to predetermined conditions, and said reference density value is determined in accordance with the density values of said specified negative images, which are determined by metering said selected specified negative images.

4. A reproducing machine according to claim 3, wherein a judgment is made whether mean density values of each of a plurality of negative images to be exposed by a selected same exposure amount is within a predetermined range, and in a case in which two or more than two out of said mean density values are within said predetermined range, one of a mean value of said mean density values is used as a new reference density value, and a predetermined reference density value is used.

5. A reproducing machine according to claim 4, wherein in a case in which a mean density value of each of said plurality of negative images to be exposed by the same exposure amount is within a range of an abnormal value, the mean value and a number of the image frame of each of said negative images are stored in a memory and after common reproducing conditions have been determined, said common reproducing conditions are corrected in accordance with a mean density value of each of said stored image so that the corrected common reproducing conditions become individual reproducing conditions for abnormal image frames.

6. A reproducing machine according to claim 1, wherein said color control amount determining means uses, as said color balance value, a color balance value which is determined by metering a large number of negative images recorded on a plurality of photographic films of a same type as the photographic film having negative images to be reproduced.

7. A reproducing machine according to claim 6, wherein said color control amount determining means computes a weighted mean value of said color balance value and a color balance mean value of respective negative images to be reproduced, and uses the weighted mean value as a color control amount.

8. A reproducing machine according to claim 1, wherein in a case in which information indicating that exposure was corrected when negative images were photographed is recorded on said information recording section, said common reproducing conditions computing means corrects common reproducing conditions in accordance with a exposure correction amount indicated by said information.

9. A reproducing machine according to claim 1, wherein among a plurality of negative images to be reproduced under the same reproducing conditions, with respect to the negative images whose density is outside a predetermined range, said reproducing control means corrects the common reproducing conditions in accordance with the density of said respective negative images for reproduction thereof.

10. A method of determining reproducing conditions, comprising the steps of:

reading information recorded on an information recording section of a photographic film;

selecting from a plurality of negative images recorded on said photographic film, negative images to be reproduced under the same reproducing conditions, on the basis of the information read from said information recording section; and determining common reproducing conditions for the selected plurality of negative images in accordance with a density control amount on a basis of a film base density and a reference density value, of a photographic film, and a color control amount on a basis of a color balance value which is determined from a plurality of negative images.

11. A method of determining reproducing conditions according to claim 10, wherein one of a value which is determined by metering a photographic film having negative images to be reproduced, and a value which is determined by metering a plurality of photographic films of a same type as said photographic film, is used as said photographic film base density.

12. A method of determining reproducing conditions according to claim 11, wherein said film base density is a density of a non-image forming area, the density being determined by the value resulting from metering the non-image forming area including side edge portions of a negative film, and portions between negative images adjacent to each other.

13. A method of determining reproducing conditions according to claim 11, wherein said film base density is one of a minimum value among density values of respective portions of a negative film, the minimum value being determined by the value resulting from metering an entire surface of the negative film, and a mean value of density values within a range equal to blank portions of respective portions of the negative film.

14. A method of determining reproducing conditions according to claim 11, wherein said film base density is one of a mean value of film base densities of a plurality of negative films of the same type as the photographic film having negative images to be reproduced, and a weighted mean value of said mean value and the film base density value which is detected from a negative film having negative images to be exposed.

15. A method of determining reproducing conditions according to claim 11, wherein said reference density is a mean density value of a large number of negative images, excluding a film base density.

16. A method of determining reproducing conditions according to claim 10, wherein said color control amount is an amount obtained on the basis of a color balance value which is determined by metering a large number of negative images recorded on a photographic film of a same type as the photographic film having negative images to be reproduced.

17. A method of determining reproducing conditions according to claim 16, wherein said color control amount is an amount which is obtained by computing a weighted mean value of said color balance value and a color balance mean value of respective negative images to be reproduced.

* * * * *